US011176497B2

(12) United States Patent
Ma

(10) Patent No.: US 11,176,497 B2
(45) Date of Patent: Nov. 16, 2021

(54) ROUTING METHOD AND ROUTING DEVICE

(71) Applicant: Hitachi, Ltd., Tokyo (JP)

(72) Inventor: Jian Ma, Beijing (CN)

(73) Assignee: HITACHI, LTD., Tokyo (JP)

( * ) Notice: Subject to any disclaimer, the term of this patent is extended or adjusted under 35 U.S.C. 154(b) by 432 days.

(21) Appl. No.: 16/226,705

(22) Filed: Dec. 20, 2018

(65) Prior Publication Data

US 2019/0197439 A1 Jun. 27, 2019

(30) Foreign Application Priority Data

Dec. 22, 2017 (CN) .......................... 201711401079.9

(51) Int. Cl.
  *G06Q 10/04* (2012.01)
  *G01C 21/34* (2006.01)
(52) U.S. Cl.
  CPC ......... *G06Q 10/047* (2013.01); *G01C 21/343* (2013.01); *G01C 21/3446* (2013.01); *G01C 21/3492* (2013.01)
(58) Field of Classification Search
  None
  See application file for complete search history.

(56) References Cited

U.S. PATENT DOCUMENTS

| 2002/0059025 A1* | 5/2002 | Kim ........................ G01C 21/34 701/533 |
| 2009/0276150 A1* | 11/2009 | Vorlander ........ G08G 1/096827 701/533 |
| 2011/0208429 A1* | 8/2011 | Zheng ................. G01C 21/3484 701/533 |
| 2013/0294702 A1* | 11/2013 | Baselau ............... G09B 29/106 382/199 |
| 2014/0188389 A1* | 7/2014 | Rego ..................... G06Q 10/047 701/533 |
| 2015/0338226 A1* | 11/2015 | Mason ................... G06Q 10/04 701/408 |
| 2017/0059331 A1* | 3/2017 | Ni ........................... G01C 21/20 |
| 2017/0328725 A1* | 11/2017 | Schlesinger ....... G01C 21/3484 |

FOREIGN PATENT DOCUMENTS

| CN | 104036381 A | 9/2014 |
| CN | 104121918 A | 10/2014 |
| CN | 104598994 A | 5/2015 |
| CN | 105046365 A | 11/2015 |
| EP | 1918895 A2 * | 5/2008 ....... G08G 1/096883 |

* cited by examiner

*Primary Examiner* — Khoi H Tran
*Assistant Examiner* — Tristan J Greiner
(74) *Attorney, Agent, or Firm* — Mattingly & Malur, PC

(57) ABSTRACT

A routing method comprises: a second matrix forming step of based on first matrices indicating travel time of a vehicle between all sites in each specified time intervals in a time period forming second matrices corresponding to the specified time intervals within one day respectively; a third matrix forming step of performing a pre-process calculation on the elements at the same position in all the second matrices, and forming one third matrix with values from the pre-process calculation; a route generating step of generating a route corresponding to the pre-process based on the third matrix; and a route selecting step of: calculating a travel time for the route generated in the route generating step based on the second matrix, and selecting the route with the shortest travel time for routing the vehicle.

7 Claims, 4 Drawing Sheets

```
CALCULATING THE TRANSIT TIME COST C(i, j)
FROM THE PARKING LOT TO EACH PAIR OF
DISTRIBUTION SITES (i, j) WITH THE THIRD TRAVEL
TIME MATRIX (STEP S41)
```
↓
```
SORTING ALL C(i, j) VALUES IN DESCENDING
ORDER (STEP S42)
```
↓
```
FOR C(i, j) VALUES SORTED IN DESCENDING
ORDER, GENERATING TRAVEL ROUTES
SEQUENTIALLY FOR SITE PAIRS (i, j) (STEP S43)
```

ROUTING METHOD AND ROUTING DEVICE

CLAIM OF PRIORITY

The present application claims priority from Chinese patent application CN 201711401079.9 filed on Dec. 22, 2017, the content of which is hereby incorporated by reference into this application.

BACKGROUND OF THE INVENTION

The present invention relates to routing method and routing device for vehicles in logistics, and in particular to routing method and routing device for vehicles in consideration of road traffic conditions.

The logistics industry is a service industry that takes into account both cost and service quality. When providing logistics distribution services to customers, logistics service providers need to provide efficient and punctual services while minimizing the cost of services.

Distribution is the key point of logistics service, which refers to the process of transporting goods from the departure place (i.e., the parking lot) to the destination (i.e., the distribution site) according to the customer's requirements on time and volume for goods transportation. Logistics service providers generally reduce the travel time of distribution vehicles in order to reduce distribution costs while meeting the customer's requirements.

Vehicle Routing Problem (VRP) is a classic problem of logistics distribution and it is also a classic problem of operations research. Given a set of sites with different distribution requirements and a set of distribution vehicles with limited capacity, goal of VRP is to obtain the travel route of the distribution vehicles that minimizes the total travel time (travel route) of all vehicles when the distribution is completed. In vehicle routing, it is sometimes necessary to consider restrictions such as time window (i.e., the site requires distribution at a specific time), distribution and pick-up, and vehicle type, etc.

CN 104036381 A (Patent Document 1) discloses a single-vehicle streamline logistics transportation dispatching method on basis of immune genetic algorithm, aiming at solving the problem of streamline production logistics transportation scheduling for a single vehicle type in multiple parking lots.

CN 104598994 A (Patent Document 2) discloses related logistics transportation optimized dispatching method with time-varying time window.

CN105046365 A (Patent Document 3) discloses a method for logistics distribution routing considering traffic congestion information which combines congestion condition in a form of congestion matrix into a greedy algorithm solving process.

CN 104121918 A (Patent Document 4) discloses real-time path planning method and system, which improve the accuracy of the path planning result, especially for traffic variation without obvious regularity, and improve the accuracy of path planning.

SUMMARY OF THE INVENTION

However, according to Patent Documents 1 and 2, actual road traffic condition is not considered when making vehicle routing. For example, the same route has different road conditions at different times of the day (such as at the morning and evening peaks and at the noon), and the travel times of the vehicle are also different. The travel route from the methods described in Patent Documents 1 and 2 is not an optimal route, and there is a problem of an increase in cost and a decrease in service quality.

Patent Document 3 only discloses content of generating one distribution route for one vehicle, and cannot be used to cope with the situation of multi-vehicle and multi-site that is ubiquitous in the logistics industry.

Although Patent Document 4 considers the road traffic condition, it is only for a vehicle to plan a travel route at a certain time, and it is not intended to plan a travel route for a plurality of vehicles for a certain period of time (for example, one full day).

The present invention has been made to solve the above problems. An object of the invention is to provide a routing method and a routing device for the situation of multi-vehicle and multi-site in consideration of road traffic condition.

A first aspect of the invention is a routing method for routing a vehicle in a route including a plurality of sites. The routing method is characterized by comprising: a second travel time matrix forming step of: calculating a representative travel time by using M first travel time matrices, and forming N second travel time matrices by using the representative travel time as element thereof, wherein each element of the first travel time matrix indicates the travel time of the vehicle between two specified sites for a specified time interval in a time period, the representative travel time represents the travel time of the vehicle between all the sites in each of the specified time intervals within one day, the N second travel time matrices correspond to the specified time intervals within one day respectively, the time period is longer than one day, M and N are both natural numbers, and M≥N; a third travel time matrix forming step of: performing a pre-process calculation on the elements at the same position in all the second travel time matrices, and forming one third travel time matrix with values from the pre-process calculation, wherein the pre-process calculation comprises at least one of a minimum value calculation, a maximum value calculation, an median value calculation, and an average value calculation; a travel route generating step of generating a travel route corresponding to the pre-process based on the third travel time matrix; and a travel route selecting step of: calculating a travel time for the travel route generated in the travel route generating step based on the second travel time matrix, and selecting the travel route with the shortest travel time for routing the vehicle.

A second aspect of the invention is a routing method. Based on that of the first aspect, the routing method is characterized by further comprising: a first travel time matrix forming step of: before the second travel time matrix forming step, obtaining the travel time of the vehicle between all the sites in each of the specified time intervals in the time period, and forming the M first travel time matrices corresponding to the specified time intervals in the time period respectively by using the obtained travel time as element thereof.

A third aspect of the invention is a routing method. Based on that of the first or second aspect, the routing method is characterized by: in the second travel time matrix forming step, selecting, from the M first travel time matrices, P first travel time matrices for a duration in which the road traffic condition is close to the day of the vehicle travel, and forming the N second travel time matrices with only the P first travel time matrices, wherein the duration is no longer than the time period and no shorter than one day, P is a natural number, and M≥P≥N.

A fourth aspect of the invention is a routing method. Based on that of the first or second aspect, the routing method is characterized by: in the second travel time matrix forming step, selecting N first travel time matrices for one day in which the road traffic condition is close to the day of the vehicle travel as the N second travel time matrices.

A fifth aspect of the invention is a routing method. Based on that of the first or second aspect, the routing method is characterized by: in the third travel time matrix forming step, performing the minimum value calculation, the maximum value calculation, the median value calculation, and the average value calculation for the elements at the same position in all the second travel time matrices respectively, in the travel route generating step, generating a set of travel routes corresponding to the minimum value calculation, the maximum value calculation, the median value calculation, and the average value calculation respectively based on the third travel time matrix, and in the travel route selecting step, calculating the travel time for the set of travel routes generated in the travel route generating step, and selecting the travel route with the shortest travel time for routing the vehicle.

A sixth aspect of the invention is a routing method. Based on that of the first or second aspect, the routing method is characterized in that: the travel route generating step comprises a transit time cost calculating step of: with the third travel time matrix, calculating the transit time cost $C(i, j)$ from a parking lot to each pair of distribution sites $(i, j)$ according to the following equation:

$$C(i,j)=R(0,i)+R(0,j)-R(i,j)$$

wherein 0 represents the parking lot, i and j represent the distribution sites, and $R(0, i)$, $R(0, j)$ and $R(i, j)$ are elements in the third travel time matrix.

A seventh aspect of the invention is a routing method. Based on that of the sixth aspect, the routing method is characterized in that: the travel route generating step further comprises a descending ordering step of: arranging all of the $C(i, j)$ values calculated in the transit time cost calculating step in descending order.

An eighth aspect of the invention is a routing method. Based on that of the seventh aspect, the routing method is characterized by: in the travel route generating step, routing for the sites pair $(i, j)$ according to the $C(i, j)$ values in descending order, if neither of the sites i and j is included in the previously generated travel route, generating a travel route consisting of the parking lot and the sites i, j; if one of the sites i and j has been added to the previously generated travel route and the one is adjacent to the parking lot, adding the other site to the previously generated travel route; and if the sites i and j belong to different previously generated travel routes, and both sites i and j are adjacent to the parking lot, merging the different previously generated travel routes into a new travel route.

A ninth aspect of the invention is a routing device for routing a vehicle in a route including a plurality of sites. The routing device is characterized by comprising: a second travel time matrix forming module for: calculating a representative travel time by using M first travel time matrices, and forming N second travel time matrices by using the representative travel time as element thereof, wherein each element of the first travel time matrix indicates the travel time of the vehicle between two specified sites for a specified time interval in a time period, the representative travel time represents the travel time of the vehicle between all the sites in each of the specified time intervals within one day, the N second travel time matrices correspond to the specified time intervals within one day respectively, the time period is longer than one day, M and N are both natural numbers, and M≥N; a third travel time matrix forming module for: performing a pre-process calculation on the elements at the same position in all the second travel time matrices, and forming one third travel time matrix with values from the pre-process calculation, wherein the pre-process calculation comprises at least one of a minimum value calculation, a maximum value calculation, an median value calculation, and an average value calculation; a travel route generating module for generating a travel route corresponding to the pre-process based on the third travel time matrix; and a travel route selecting module for: calculating a travel time for the travel route generated in the travel route generating module based on the second travel time matrix, and selecting the travel route with the shortest travel time for routing the vehicle.

According to embodiment of the present invention, a routing method and a routing device for a situation of multi-vehicle and multi-site in consideration of road traffic condition are provided, which can minimize the distribution cost while guaranteeing service quality.

DETAILED DESCRIPTION OF THE PREFERRED EMBODIMENTS

Figure 1:
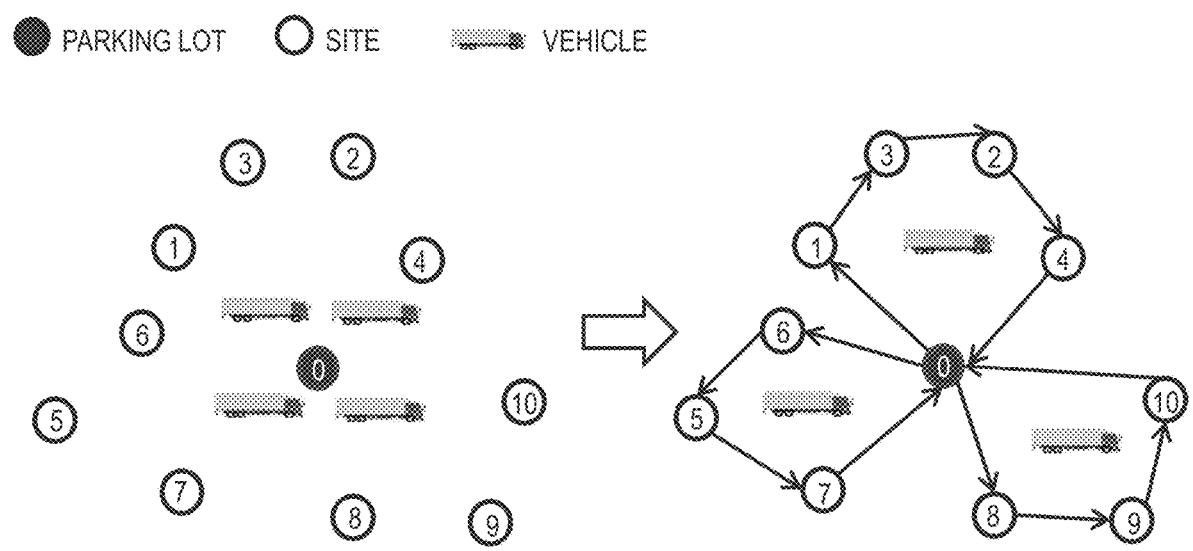
FIG. 1 is a schematic diagram showing vehicle routing for a situation of single-lot and multi-site.

FIG. 1 is a schematic diagram showing vehicle routing for a situation of single-lot and multi-site. In FIG. 1, one parking lot, ten distribution sites and four distribution vehicles are shown. In FIG. 1, the solid circle indicates the parking lot, the hollow circles indicate the sites, the vehicle marks indicate the distribution vehicles, the solid circle with "0" also indicates the parking lot, and the numbers 1 to 10 in the hollow circles indicate different sites. However, this is only an example. The numbers of the sites and the distribution vehicles are not specifically limited and can be selected according to actual needs.

As shown in FIG. 1, through a vehicle routing, one vehicle is responsible for the distribution for the travel route of "parking lot->site 6->site 5->site 7->parking lot, the second vehicle is responsible for the distribution for the travel route of "parking lot->site 1->site 3->site 2->site 4->parking lot", and the third vehicle is responsible for the distribution for the travel route of "parking lot->site 8->site 9->site 10->parking lot".

Further, in the following description, in order to make the explanation easy to understand, there is a case where the parking lot and the distribution site are simply referred to as "site".

Figure 2:
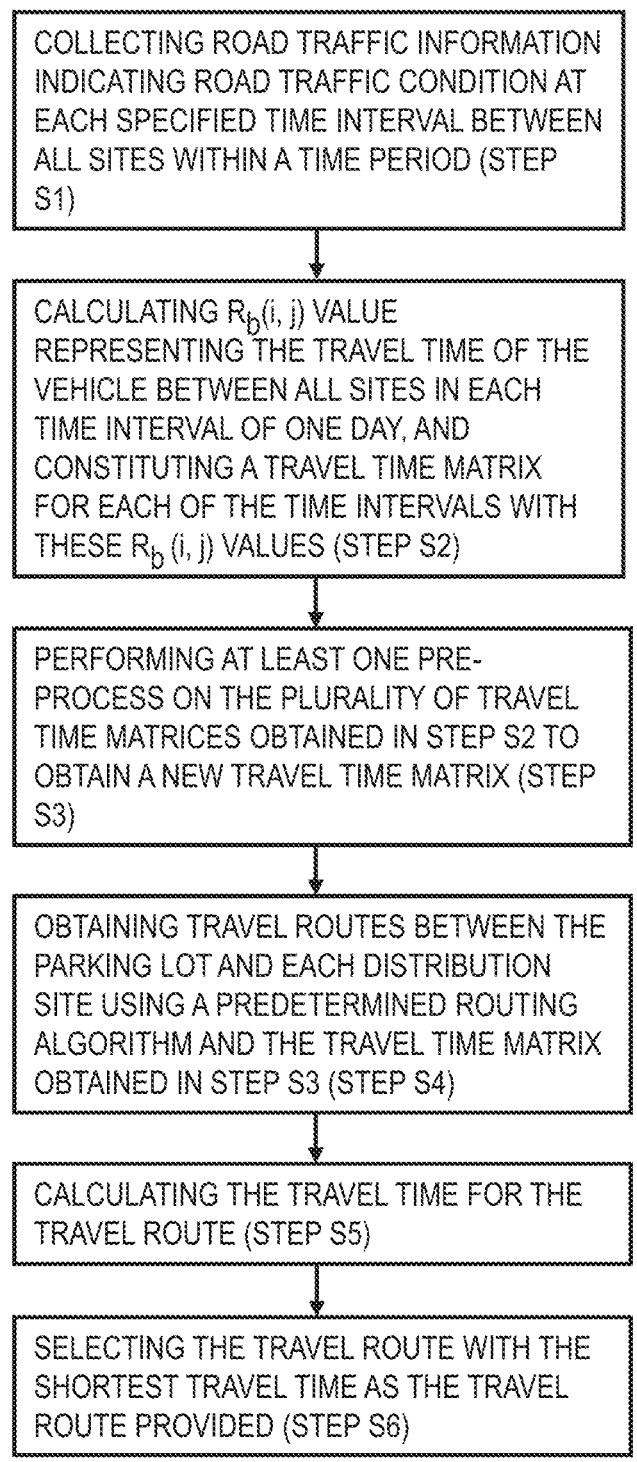
FIG. 2 is a flow chart showing a routing method according to an embodiment of the present invention.

FIG. 2 is a flow chart showing a routing method according to an embodiment of the present invention.

First, road traffic information (travel time) indicating road traffic condition at each specified time interval (for example, 1 hour) between all sites within a time period (for example, 1 year) is collected. After that, a travel time matrix corresponding to each specified time intervals within the time period is formed by using the collected travel time (step S1). In the present embodiment, the road traffic condition is represented by travel time. Specifically, the road traffic condition between two sites is represented by the time required for the vehicle to travel between the two sites. In the present embodiment, the time period is one year and the specified time interval is one hour; however, the examples are not restrictive and can be changed as needed. For example, it is also possible that the time period is half year or two years, and the specified time interval is 0.5 hours. The smaller the specified time interval, the higher the accuracy of the routing, and the greater the amount of data collected and the amount of calculation.

Figures 3, 4:
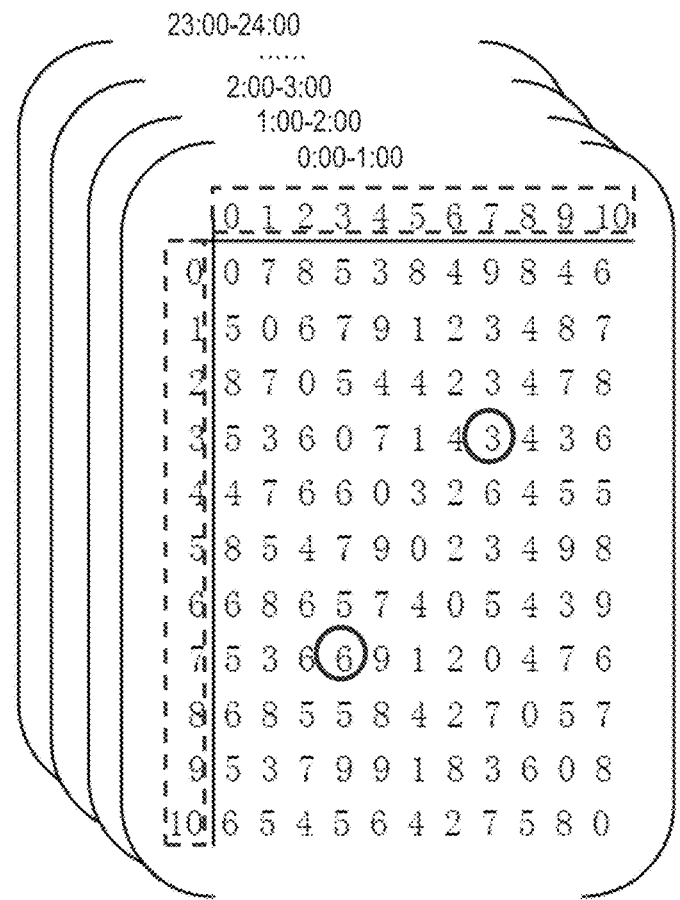
FIG. 3 is a schematic diagram showing a travel time matrix for all sites in each time interval in one day.
FIG. 4 is a diagram for explaining step S4 in FIG. 3, which is a flow chart for planning a set of travel routes between the parking lot and each of the distribution sites.

FIG. 3 is a schematic diagram (in units of 10 minutes) showing a travel time matrix for all sites in each time interval in one day. In FIG. 3, 0 to 10 among the numbers enclosed by the lower left dotted line frame indicate the departure sites, and 0 to 10 among the numbers enclosed by the upper right dotted frame indicate the destination sites (i.e., the arrival sites). According to FIG. 3, for example, the travel time R(3, 7) would be 30 minutes assuming that there is a travel from the departure site 3 to the destination site 7 during the period from 0:00 to 1:00. The travel time R(7, 3) would be 60 minutes assuming that there is a travel from the departure site 7 to the destination site 3 during the period from 0:00 to 1:00. If i is the departure site and j is the arrival site, then R(i, j) indicates the travel time from the departure site i to the arrival site j.

Therefore, if the specified time interval is 1 hour, then one day can be divided into 24 time intervals. Based on the road traffic information between all the sites in one day, a total of 24 travel time matrices respectively indicating the travel times of all the sites at each of the time intervals can be obtained. According to the road traffic information between all sites in one year (365 days), 24×365 (i.e., 8760) travel time matrices (referred as "first travel time matrix") can be obtained. These first travel time matrices can be used to form a first time matrix database.

In the first travel time matrix, since there is only one R(i, j) value in each time interval (for example, 8:00~9:00) every day, for the same time interval (for example, 8:00~9:00), there are 365 R(i, j) values in one year. These 365 R(i, j) values can be represented by $R_1(i, j)$, $R_2(i, j)$, $R_3(i, j)$, . . . , $R_{365}(i, j)$. It is also possible to divide the 365 R(i, j) values into $R_g(i, j)$ values corresponding to working days, $R_z(i, j)$ values corresponding to weekends (Saturday and Sunday), and Rj(i, j) values corresponding to holidays (e.g. Mid-Autumn Festival, Spring Festival, etc.). For example, if there are 260 working days in 365 days of the year, 260 of the 365 R(i, j) values for each time period are divided into the $R_g(i, j)$ values. The subscript g indicates that the $R_g(i, j)$ value is the R(i, j) value for working day, the subscript z indicates that the $R_z(i, j)$ value is the R(i, j) value for weekend, and the subscript j indicates that the $R_j(i, j)$ value is the R(i, j) value for holiday.

Then, based on the first travel time matrix obtained in step S1, $R_d(i, j)$ values representing (indicating) the travel times of the vehicle between all sites in each time interval of one day are calculated. These $R_d(i, j)$ values constitute a new travel time matrix for each of the time intervals (hereinafter also referred to as "second travel time matrix") (step S2). The subscript d indicates that the $R_d(i, j)$ value is an element in the second travel time matrix. By averaging 365 R(i, j) for each time interval, $R_d(i, j)$ for each time interval can be calculated. For example, $R_d(i, j)$ for each time interval can be calculated by the following equation (1).

$$R_d(i,j)=(R_1(i,j)+R_2(i,j)+R_3(i,j)+ \ldots +R_{365}(i,j))/365 \qquad (1)$$

In Step S2, it is possible to calculate only the second travel time matrices corresponding to workdays (hereinafter simply referred to as "workday second travel time matrix"). By averaging all $R_g(i, j)$ for each of the time intervals, $R_d(i, j)$ in the workday second travel time matrix for each of the time intervals can be calculated.

Based on the same method, the weekend second travel time matrix and the holiday second travel time matrix can also be calculated.

In step S2, any one, two, three, or all of the second travel time matrix, the workday second travel time matrix, the weekend second travel time matrix, and the holiday second travel time matrix described above may be calculated.

The manner in which the second travel time matrix is calculated using all of the first travel time matrices has been described above. However, the present invention is not limited thereto, and the second travel time matrix may be calculated by selecting the first travel time matrix for a certain duration in one year (for example, a duration closest to the road traffic condition of the current day). In addition, the first travel time matrix of one day closest to the road traffic condition of the current day may be selected, and the selected first travel time matrix may be directly used as the second travel time matrix.

In the present embodiment, since the specified time interval described above is one hour and there are 24 time intervals in one day, 24 second travel time matrices can be formed. The 24 second travel time matrices can be used to form the second travel time matrix database. It is also possible to form a workday second travel time matrix database by using 24 workday second travel time matrices. Similarly, the weekend second travel time matrix database and the holiday second travel time matrix database may be formed.

Then, the plurality of (24 in the present embodiment) second travel time matrices obtained in Step S2 are pre-processed to obtain one third travel time matrix (Step S3). R(i, j) in the third travel time matrix indicates the travel time from the site i to the site j.

There are four pre-process methods in Step S3, namely: pre-process for performing minimum value calculation, pre-process for performing maximum value calculation, pre-process for performing median value calculation, and pre-process for performing average value calculation. Hereinafter, these four methods will be specifically explained.

As described above, in Step S2, 24 second travel time matrices corresponding to 24 time intervals are formed, and each of the second travel time matrices is formed by a plurality of $R_d(i, j)$ shown in FIG. 3. In FIG. 3, the ranges of i and j are both 0 to 10.

The pre-process for performing minimum value calculation is to select the smallest $R_d(i, j)$ value from the 24 $R_d(i, j)$ values of the 24 second travel time matrices described above as R(i, j) value in the third travel time matrix.

The pre-process for performing maximum value calculation is to select the largest $R_d(i, j)$ value from the 24 $R_d(i, j)$ values of the 24 second travel time matrices described above as R(i, j) value in the third travel time matrix.

The pre-process for performing median value calculation is to arrange 24 $R_d(i, j)$ values of the 24 second travel time matrices described above in ascending order, perform median value calculation on the 24 $R_d(i, j)$ values arranged in this order, and use the calculated value as the R(i, j) value in the third travel time matrix. Since the method for performing median value calculation is prior art, the description thereof is omitted here.

The pre-process for performing average value calculation is to calculate the average for the 24 $R_d(i, j)$ values of the 24 second travel time matrices described above, and use the average value as the R(i, j) value in the third travel time matrix.

As described above, 24×365 travel time matrices are obtained in Step S1, 24 second travel time matrices are obtained in Step S2, and one third travel time matrix is obtained in Step S3.

The third travel time matrix obtained by performing the pre-process of minimum value calculation is referred to as the minimum value calculation third travel time matrix, the third travel time matrix obtained by performing the pre-process of maximum value calculation is referred to as the maximum value calculation third travel time matrix, the third travel time matrix obtained by performing the pre-process of median value calculation is referred to as the median value calculation third travel time matrix, and the third travel time matrix obtained by performing the pre-process of average value calculation is referred to as the average value calculation third travel time matrix.

Then, using a predetermined routing algorithm and the third travel time matrix described above, a set of travel routes between the parking lot and each distribution site is obtained (Step S4). A specific calculation method for obtaining the set of travel routes will be described in detail later.

A set of travel routes obtained by using the minimum value calculation third travel time matrix in Step S4 is referred to as the minimum value calculation travel routes; a set of travel routes obtained by using the maximum value calculation third travel time matrix in Step S4 is referred to as the maximum value calculation travel routes; a set of travel routes obtained by using the median value calculation third travel time matrix in Step S4 is referred to as the median value calculation travel routes; and a set of travel routes obtained by using the average value calculation third travel time matrix in Step S4 is referred to as the average value calculation travel routes.

The travel time for the travel route obtained in Step S4 is calculated (Step S5). The specific calculation method for the travel time for the travel route will be described in detail later.

In addition, the calculated travel time for the minimum value calculation travel route is referred to as the minimum value calculation travel route travel time. Similarly, the calculated travel time for the maximum value calculation travel route is referred to as the maximum value calculation travel route travel time, the calculated travel time for the median value calculation travel route is referred to as the median value calculation travel route travel time, and the calculated travel time for the average value calculation travel route is referred to as the average value calculation travel route travel time.

Then, the travel times for each set of travel route obtained by different pre-process methods are compared, and the travel route with the shortest travel time is selected (Step S6). Specifically, the minimum value calculation travel route travel time, the maximum value calculation travel route travel time, the median value calculation travel route travel time and the average value calculation travel route travel time are compared, the shortest travel time is selected from the four travel times, and the travel route corresponding to the shortest travel time is taken as the travel route provided by embodiment of the present invention.

For example, if the median value calculation travel route travel time is the shortest among the above four travel times, the median value calculation travel route is taken as the travel route provided by embodiment of the present invention.

FIG. 4 is a diagram for explaining step S4 in FIG. 3, which is a flow chart for planning a set of travel routes between the parking lot 0 and each of the distribution sites. Hereinafter, a method of planning a set of travel routes between the parking lot 0 and each of the distribution sites using the third travel time matrix will be specifically described using FIG. 4.

First, with the third travel time matrix obtained in Step S3, the transit time cost C(i, j) from the parking lot 0 to each pair of distribution sites (i, j) is calculated according to the following equation (2) (Step S41):

$$C(i,j)=R(0,i)+R(0,j)-R(i,j) \qquad (2)$$

The values of R(0, i), R(0, j), and R(i, j) in the above equation (2) can be obtained from the third travel time matrix.

For example, in the example shown in FIG. 1, there is one parking lot (0) and ten distribution sites (1, 2, 3, . . . , 10), then values such as C(1, 2), C(2, 1), C(1, 3), C(3, 1), . . . , C(1, 10), C(10, 1) can be calculated in Step S41.

Then, all the C(i, j) values calculated in Step S41 are sorted in descending order (Step S42). The so-called "be sorted in descending order" is to arrange all C(i, j) values in an order from the largest to the smallest.

Then, for all C(i, j) values sorted in descending order, travel routes are sequentially generated for site pairs (i, j) according to the following rules (1) to (3) (Step S43). When generating the travel routes, additional conditions should not be violated. The so-called additional conditions refer to restrictions such as a time window, a limitation on the speed of the vehicle itself, a limitation on the amount of cargo carried by the vehicle, and a limitation that the total amount of cargo carried in any of the travel routes cannot exceed the upper limit of the cargo capacity of the vehicle, etc.

(1) If neither of the sites i and j is added to the travel route (that is, in the previously generated travel route, sites i and j are not included), a new travel route consisting of the parking lot 0 and the sites i, j is generated without violating the above-mentioned additional conditions. The new travel route is a travel route of the parking lot 0->site I->site j->parking lot 0 (abbreviated as: 0->i->j->0).

(2) If one of the sites i and j (for example, site i) has been added to the previously generated travel route and the one is adjacent to the parking lot, the other site (site j) is also added to the previously generated travel route without violating the above-mentioned additional conditions.

For example, assuming that the previously generated travel route is 0->i->6->7->0, it can be said that the site i has been added to the previously generated travel route and the site i is adjacent to the parking lot. Therefore, the condition for adding another site (site j) in the above rule (2) is satisfied, then the site j is added to the travel route 0->i->6->7->0, forming a new travel route 0->i->j->6->7->0. In the new travel route, sites i and 7 are adjacent to the parking lot, and sites j and 6 are not adjacent to the parking lot.

Regarding the method for adding one site to the generated travel route, a method in the prior art can be used, and will not be described in detail herein.

(3) If the sites i and j belong to different previously generated travel routes, and both sites i and j are adjacent to the parking lot 0, the different previously generated travel routes are merged into a new travel route without violating the above-mentioned additional conditions.

For example, assuming that the travel route including the site i is 0->i->1->0, and the travel route including the site j is 0->j->2->0, the new travel route generated by merging the two is 0->1->i->j->2->0.

Regarding the method for merging two travel routes into one new travel route, a method in the prior art can be used, and will not be described in detail herein.

Step S43 is performed until the sites i, j in all C(i, j) arranged in descending order are added to the travel route whereby a set of travel routes including all sites can be formed.

Figure 5:
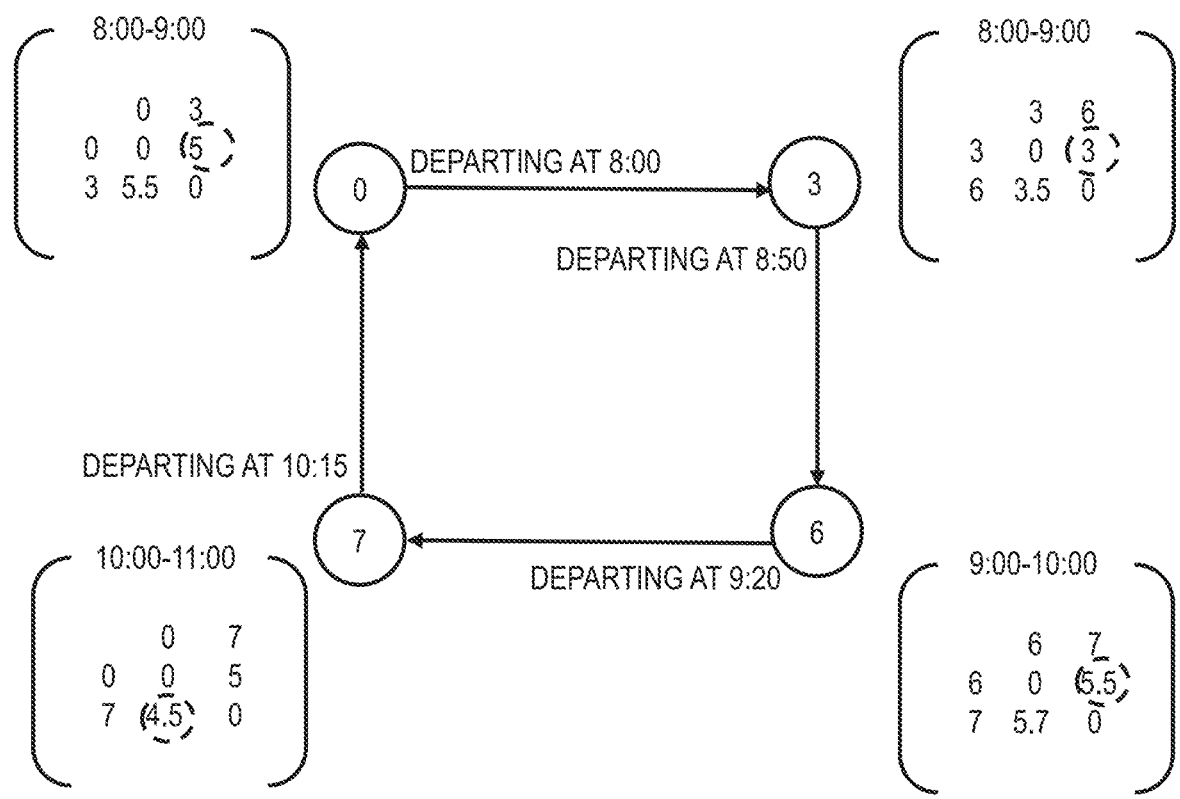
FIG. 5 is a schematic diagram showing a method of calculating the travel time of the travel route 0->3->6->7->0.

FIG. 5 is a schematic diagram showing a method of calculating the travel time of the travel route 0->3->6->7->0. The travel route 0->3->6->7->0 is just an example.

The travel route 0->3->6->7->0 includes four sections of 0->3, 3->6, 6->7, and 7->0. By adding the travel times of the four sections, the travel time of the travel route 0->3->6->7->0 can be obtained.

As described above, in the present embodiment, one day is divided into 24 time intervals of one hour, and 24 second travel time matrices are formed corresponding to the 24 time intervals. In addition, in FIG. 5, in order to simplify the description, only two related sites (that is, the departure site and the arrival site) are described in the four second travel time matrices, and other sites are omitted. In addition, the unit of each R(i, j) value in each matrix in FIG. 5 is 10 minutes.

As shown in FIG. 5, the departure time of the vehicle at the section 0->3 is 8:00, which belongs to the time interval of 8:00 to 9:00, so the travel time of the section 0->3 is R(0, 3) value in the second travel time matrix corresponding to the 8:00~9:00 time interval. In FIG. 5, the R(0, 3) value in the second travel time matrix (matrix on the upper left side) corresponding to the time interval of 8:00 to 9:00 is 5. Therefore, the travel time of the section 0->3 is 50 minutes.

In addition, the departure time of the vehicle at the section 3->6 is 8:50, which belongs to the time interval of 8:00 to 9:00, so the travel time of the section 3->6 is R(3, 6) value in the second travel time matrix corresponding to the 8:00~9:00 time interval. In FIG. 5, the R(3, 6) value in the second travel time matrix (matrix on the upper right side) corresponding to the time interval of 8:00 to 9:00 is 3. Therefore, the travel time of the section 3->6 is 30 minutes.

In addition, the departure time of the vehicle at the section 6->7 is 9:20, which belongs to the time interval of 9:00 to 10:00, so the travel time of the section 6->7 is R(6, 7) value in the second travel time matrix corresponding to the 9:00~10:00 time interval. In FIG. 5, the R(6, 7) value in the second travel time matrix (matrix on the lower right side) corresponding to the time interval of 9:00 to 10:00 is 5.5. Therefore, the travel time of the section 6->7 is 55 minutes.

In addition, the departure time of the vehicle at the section 7->0 is 10:15, which belongs to the time interval of 10:00 to 11:00, so the travel time of the section 7->0 is R(7, 0) value in the second travel time matrix corresponding to the 10:00~11:00 time interval. In FIG. 5, the R(7, 0) value in the second travel time matrix (matrix on the lower left side) corresponding to the time interval of 10:00 to 11:00 is 4.5. Therefore, the travel time of the section 7->0 is 45 minutes.

As described above, when selecting the second travel time matrix for calculating the travel time of each section, the second travel time matrix corresponding to each section is selected based on the departure time of the vehicle at the departure site of each section, rather than selecting the second travel time matrix corresponding to each section based on the arrival time of the vehicle at the destination site of each section.

As described above, the travel times of the four sections of 0->3, 3->6, 6->7, and 7->0 are 50 minutes, 30 minutes, 55 minutes, and 45 minutes, respectively. By adding the travel times together, that is, 50+30+55+45=180 (minutes), it can be obtained that the travel time of the travel route 0->3->6->7->0 is 180 minutes.

As described earlier, Step S43 is performed, until the sites i, j in all C(i, j) arranged in descending order are added to the travel route, whereby a set of travel routes including all sites can be formed. Assuming that the set of travel routes includes four travel routes I, II, III, and IV, based on the same method as the calculation method for the travel time of the above-described travel route 0->3->6->7->0, travel times for each of four travel routes I, II, III, and IV can be obtained. By adding the travel times of the four travel routes I, II, III, and IV together, the total travel time for the set of travel routes can be obtained.

Then in Step S6, the travel times for each set of travel route obtained by different pre-process methods are compared, and the travel route with the shortest travel time is selected for routing the vehicle. In this way, the travel route provided by embodiment of the present invention can be obtained.

In addition, in the step of forming the third travel time matrix in the present embodiment, the maximum value calculation, the minimum value calculation, the median value calculation, and the average value calculation are listed as the method for pre-process calculation. However, the present invention is not limited to these. Other methods can also be used as long as a travel route with short travel time can be obtained.

In addition, when the calculation method of the travel time of the travel route 0->3->6->7->0 is described above using FIG. 5, the stop time of the distribution vehicle at each site is not considered (that is, the stop time is set to 0). When actually making routing and calculating travel time of the travel route, the stop time of the distribution vehicle at each site should be considered. For example, the stop time can be treated as part of the travel time.

The routing method of the present embodiment has been described above. According to the routing method of the first embodiment, a routing method for a situation of multi-vehicle and multi-site in consideration of road traffic condition is provided, which can minimize the distribution cost.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A routing method for routing a vehicle in a route including a plurality of sites, the routing method comprising:
   a second travel time matrix forming step of: calculating a representative travel time by using M first travel time matrices, and forming N second travel time matrices by using the representative travel time as element thereof, wherein each element of the M first travel time matrices indicates the travel time of the vehicle between two specified sites for a specified time interval in a time period, the representative travel time represents the travel time of the vehicle between all the sites in each of the specified time intervals within one day, the N second travel time matrices correspond to the specified time intervals within one day respectively, the time period is longer than one day, M and N are both natural numbers, and M≥N;
   a third travel time matrix forming step of: performing a pre-process calculation on the elements at the same position in all the N second travel time matrices, and forming one third travel time matrix with values from the pre-process calculation, wherein the pre-process calculation comprises at least one of a minimum value calculation, a maximum value calculation, an median value calculation, and an average value calculation;
   a travel route generating step of generating a travel route corresponding to the pre-process based on the third travel time matrix; and
   a travel route selecting step of: calculating a travel time for the travel route generated in the travel route generating step based on the N second travel time matrices, and selecting the travel route with the shortest travel time for routing the vehicle,
   wherein the travel route generating step comprises a transit time cost calculating step of: with the third travel time matrix, calculating the transit time cost C(i, j) from a parking lot to each pair of distribution sites (i, j) according to the following equation: C(i, j)=R(0, i)+R(0, j)−R(i, j), and
   wherein 0 represents the parking lot, i and j represent the distribution sites, and R(0, i), R(0, j) and R(i, j) are elements in the third travel time matrix, wherein the travel route generating step includes:
   routing for the sites pair (i, j) according to the C(i, j) values in descending order:
   if neither of the sites i and j is included in the previously generated travel route, generating a travel route consisting of the parking lot and the sites i, j;
   if one of the sites i and j has been added to the previously generated travel route and the one is adjacent to the parking lot; adding the other site to the previously generated travel route; and
   if the sites i and j belong to different previously generated travel routes, and both sites i and j are adjacent to the parking lot, merging the different previously generated travel routes into a new travel route.

2. The routing method according to claim 1, further comprising:
   a first travel time matrix forming step of: before the second travel time matrix forming step, obtaining the travel time of the vehicle between all the sites in each of the specified time intervals in the time period, and forming the M first travel time matrices corresponding to the specified time intervals in the time period respectively by using the obtained travel time as element thereof.

3. The routing method according to claim 1,
   wherein the second travel time matrix forming step includes selecting, from the M first travel time matrices, P first travel time matrices for a duration in which a road traffic condition is close to the day of the vehicle travel, and includes forming the N second travel time matrices with only the P first travel time matrices, and
   wherein the duration is no longer than the time period and no shorter than one day, P is a natural number, and M≥P≥N.

4. The routing method according to claim 1,
   wherein the second travel time matrix forming step includes selecting N first travel time matrices for one day in which a road traffic condition is close to the day of the vehicle travel as the N second travel time matrices.

5. The routing method according to claim 1,
   wherein the third travel time matrix forming step includes performing the minimum value calculation, the maximum value calculation, the median value calculation, and the average value calculation for the elements at the same position in all the second travel time matrices respectively,
   wherein the travel route generating step includes generating a set of travel routes corresponding to the minimum value calculation, the maximum value calculation, the median value calculation, and the average value calculation respectively based on the third travel time matrix, and
   wherein the travel route selecting step includes calculating the travel time for the set of travel routes generated in the travel route generating step, and includes selecting the travel route with the shortest travel time for routing the vehicle.

6. The routing method according to claim 1,
   wherein the travel route generating step further comprises a descending ordering step of: arranging all of the C(i, j) values calculated in the transit time cost calculating step in descending order.

7. A routing device for routing a vehicle in a route including a plurality of sites, the routing device comprising:
   at least one processor configured to execute a plurality of modules comprising:
   a second travel time matrix forming module for: calculating a representative travel time by using M first travel time matrices, and forming N second travel time matrices by using the representative travel time as element thereof, wherein each element of the M first travel time matrices indicates the travel time of the vehicle between two specified sites for a specified time interval in a time period, the representative travel time represents the travel time of the vehicle between all the sites in each of the specified time intervals within one day, the N second travel time matrices correspond to the specified time intervals within one day respectively, the time period is longer than one day, M and N are both natural numbers, and M≥N;
   a third travel time matrix forming module for: performing a pre-process calculation on the elements at the same position in all the second travel time matrices, and forming one third travel time matrix with values from the pre-process calculation, wherein the pre-process calculation comprises at least one of a minimum value calculation, a maximum value calculation, an median value calculation, and an average value calculation;
a travel route generating module for generating a travel route corresponding to the pre-process based on the third travel time matrix; and
a travel route selecting module for: calculating a travel time for the travel route generated in the travel route generating module based on the N second travel time matrices, and selecting the travel route with the shortest travel time for routing the vehicle,
wherein the travel route generating step comprises a transit time cost calculating step of: with the third travel time matrix, calculating the transit time cost $C(i, j)$ from a parking lot to each pair of distribution sites $(i, j)$ according to the following equation: $C(i, j)=R(0, i)+R(0, i)-R(i, j)$, and
wherein 0 represents the parking lot, i and j represent the distribution sites, and $R(0, i)$, $R(0, j)$ and $R(i, j)$ are elements in the third travel time matrix, wherein the travel route generating step includes:
routing for the sites pair $(i, j)$ according to the $C(i, j)$ values in descending order:
if neither of the sites i and j is included in the previously generated travel route, generating a travel route consisting of the parking lot and the sites i, j;
if one of the sites i and j has been added to the previously generated travel route and the one is adjacent to the parking lot; adding the other site to the previously generated travel route; and
if the sites i and j belong to different previously generated travel routes, and both sites i and j are adjacent to the parking lot, merging the different previously generated travel routes into a new travel route.

* * * * *